United States Patent [19]

Berger et al.

[11] 4,195,850
[45] Apr. 1, 1980

[54] GASKET STRIP FOR BUTT JOINT COMPRESSION SEAL

[75] Inventors: Ernst Berger, Altdorf; Norbert Herwegh, Schattdorf, both of Switzerland

[73] Assignee: Datwyler AG, Schweiz. Kabel-Gummi-u.Kunststoffwerke, Altdorf, Switzerland

[21] Appl. No.: 22,053

[22] Filed: Mar. 19, 1979

[30] Foreign Application Priority Data

Mar. 23, 1978 [CH] Switzerland ............... 32418/78

[51] Int. Cl.² .................. E04B 1/68; F16J 15/10
[52] U.S. Cl. .................... 277/12; 277/205; 277/207 R; 52/396; 52/403; 404/64; 405/135
[58] Field of Search .............. 277/166, 12, 34, 34.3, 277/34.6, 205, 206 R, 206 A, 207 R, 211; 52/396, 403; 49/475; 404/64, 65; 405/135, 147

[56] References Cited

U.S. PATENT DOCUMENTS

| 2,230,303 | 2/1941 | Leguillon | 404/65 |
| 2,937,065 | 5/1960 | Harza | 277/205 X |
| 3,363,383 | 1/1968 | La Barge | 404/65 X |
| 3,750,411 | 8/1973 | Shimizu | 405/135 |
| 4,043,693 | 8/1977 | Brown | 404/64 |
| 4,045,037 | 8/1977 | Pippert | 277/205 |

FOREIGN PATENT DOCUMENTS

| 1235974 | 3/1967 | Fed. Rep. of Germany | 404/64 |
| 2145500 | 3/1972 | Fed. Rep. of Germany | 52/396 |
| 1230865 | 5/1971 | United Kingdom | 52/396 |

Primary Examiner—Robert S. Ward, Jr.
Attorney, Agent, or Firm—Weingarten, Maxham & Schurgin

[57] ABSTRACT

In order to form a tighter seal, especially at corner butt joints, between polygonal construction plate elements which are pressed together at their edges with an intervening gasket strip, the strip is provided at its critical sealing section with a second material of greater elasticity than the first, main gasket material. A third material which plastically deforms under pressure is partially embedded in the second material. The pressure of the second material when compressed forces the third material to flow into low seal pressure spaces and gaps of the seal to form a bonded seal with a seal pressure which is distributed by the deformation of the third material. Various configurations of the gasket cross-section and of corner segments are described.

8 Claims, 10 Drawing Figures

Fig. 5a
Fig. 5b
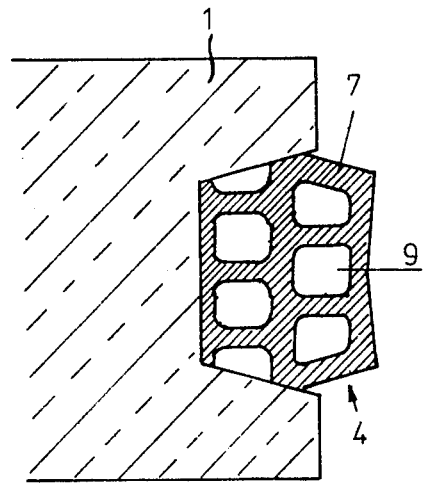
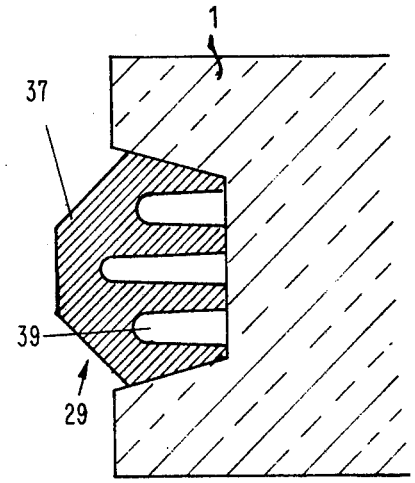
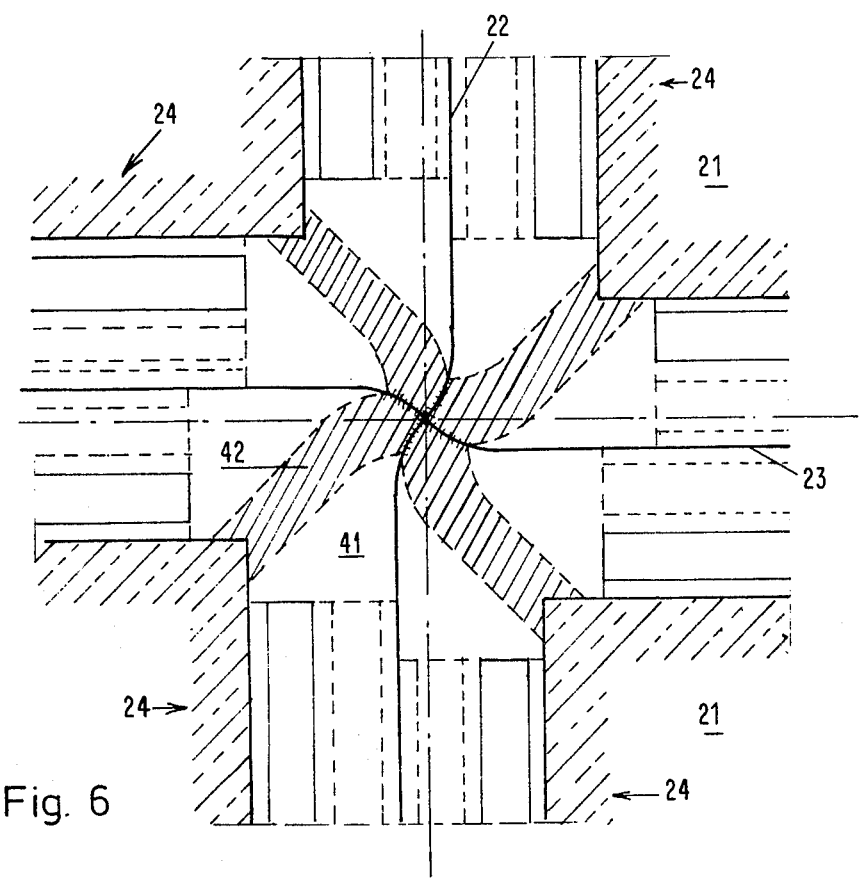
Fig. 6

GASKET STRIP FOR BUTT JOINT COMPRESSION SEAL

BACKGROUND OF THE INVENTION

The invention relates to a gasket strip for providing a seal between butt joints and intersections of individual building elements where each building element has a polygonal cross-section and a flat face at each end, with at least one such gasket strip extending as a type of frame from one end face to the other along to opposing sides of the polygonal cross-section as well as over the end faces themselves.

When a plurality of prefabricated concrete, steel, or other elements are joined together to form the wall of a pipe with a round or a rectangular cross-section, it is not always possible to afterwards seal the joints. The reasons for this can be continual high water pressure; weather influences; lack of access to the joints, e.g. with large element depths; completion deadlines; etc. In such cases, it is possible to already apply a gasket before assembly of the elements and then to so compress the gasket in the assembly that the necessary sealing function is immediately provided, without the need for an additional later treatment to establish the seal.

The building elements in question usually have a rectangular cross-section, but there can also be used polygonal shapes such as triangles, hexagons, etc. Here it is not essential whether the elements are planar or curved (e.g. a bow-shaped cross-section, when a plurality of elements are joined together to make a pipe). It is necessary only that the end sealing faces of the elements always lie in a common plane.

The seal is so designed that each gasket strip forms a frame corresponding to the diametrical shape of the elements and is installed on the narrow faces leading around each element. The fixing in place of the gasket frame is preferably obtained in that the end faces of the elements have a groove into which a portion of the gasket cross-section can be seated, while the other portion protrudes and is later compressed in the assembly. The distance of the protruding portion extends out from the end face, depends on the width of the desired joint, the predicted joint tolerance, and the necessary minimum compression to provide a secure sealing.

Such gasket strips are known in various forms and are used especially in sealing tunnels with tubbings of steel or concrete. ("Tubbings" are largely rectangular elements which in one direction are curved in an arc. A plurality of such tubbings joined together form a circular ring. If a number of such rings are assembled coaxially in series, then there is formed a pipe of any desired length.)

The difficulty in sealing lies foremost in the design of the corners. In the sections with a linear-shaped seal, whether it is curved or straight, the sealing with profiled gaskets is simple to calculate and to test, since, for each seal width which arises, the effective seal pressure can be found with the aid of a pressure curve diagram.

The sealing difficulty is in the corner regions. Depending on the mode of assembly, there arises here a T-shaped joint in which two elements together butt against the lengthwise side of a third element, or a cross-shaped joint when four element corners simultaneously abut against each other. With acute-angled elements there are also theoretically conceivable joining points at which more than four corners abut.

While in the sections with a linear-shaped joint there arise tolerances of $\pm X$, in the corner regions the tolerances can add to one another in various ways. In the most extreme case, all four corners can be so displaced relative to one another that there arises a square opening between the elements.

Even in the case of a T-shaped joint without tolerance deviations, there are difficulties with the sealing in the immediate contact point of the gasket corners. While, as mentioned, the sealing pressure in the region of the linear-shaped seal can be determined in advance, in the region of the corners it drops off in an uncontrollable manner and, depending on how the elements are oriented in the assembly, can be practically zero in the farthest corner region. It is substantially further reduced if joint tolerances appear at the intersecting point, or when more than two corners adjoin. In such cases there is today no longer possible a secure sealing, and these regions must be sealed by a later procedure, e.g. by injection of a synthetic filler.

It is an object of the invention to provide a gasket strip for which at least one region is so designed that by means of the pressure arising in a stressing or a compression there occurs a complete sealing also at these critical places.

SUMMARY OF THE INVENTION

The novel gasket strip according to the present invention has at least one section consisting of a material which is more elastic than the material of the remaining sections of the gasket strip. In this section, there is a depression in which there is a material which deforms plastically under pressure.

BRIEF DESCRIPTION OF THE DRAWINGS

FIGS. 5a, 5b are cross-sectional views of the gasket strips of FIGS. 3 and 4, respectively, in regions outside the corner segment of the gasket strip.

FIG. 6 is a horizontal section through one of the intersections of the plates of FIG. 1, showing in more detail the interaction of the internal features of the gasket strip.

DESCRIPTION OF THE PREFERRED EMBODIMENTS

Figure 1:
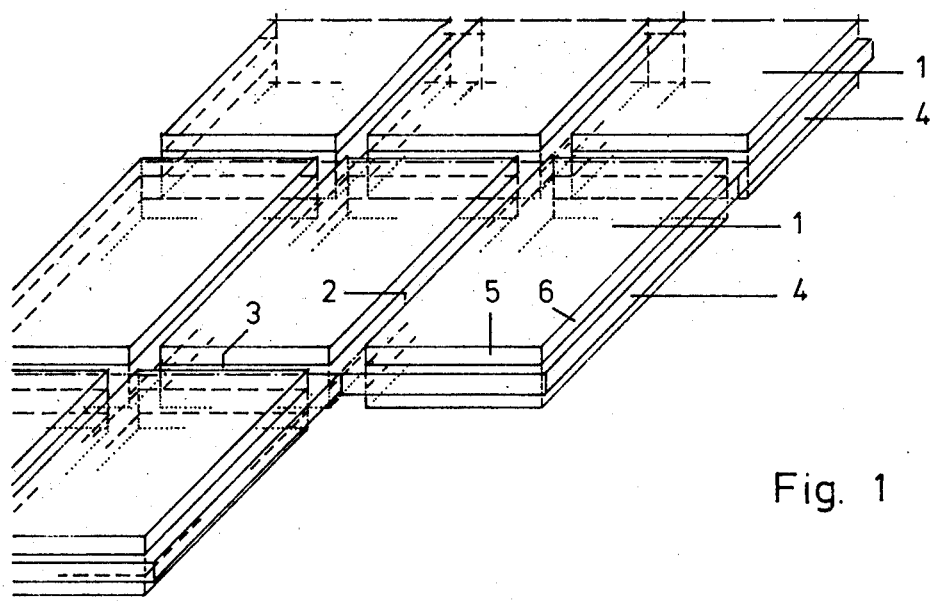
FIG. 1 is an elevated perspective, schematic view of a floor or wall assembled with flat plates sealed by a gasket strip in accordance with the invention.

In FIG. 1 there is shown a floor assembled with building elements 1. A wall could also be built in a similar manner. The elements 1 are so arranged that there arise lengthwise joints 2 and crosswise joints 3 which cross each other.

Each building element 1 is surrounded by a gasket strip 4 which, as can be seen, extends around all the narrow sides of the parallelepiped-shaped element 1, that is, over the two lengthwise narrow faces 6 and the crosswise faces 5 lying therebetween. It forms a kind of frame about the element 1. Because here the element is relatively thin, it carries only a single gasket strip. For thicker elements, however, there can readily be used two or more gasket strips. The number of these has no bearing on the invention.

As can be seen, here the elements 1 abut only with their gasket strips 4. With compression, a good seal is formed at the abutting faces. In the corners, at the intersections of the joints 2 and 3, the pressure nevertheless falls, and does so either as a result of tolerances in the material, as a result of the arrangement of the elements, or both. Here, then, is a place where a leak could arise which even with great gasket compression would not reliably seal. The measures for preventing such a leak location are described below.

It is not absolutely necessary for the invention that the elements 1 abut with their gasket strips 4. One element with a gasket strip can, for example, also abut against one without such, or the gasket strips can be arranged staggered on abutting elements.

Figure 2:
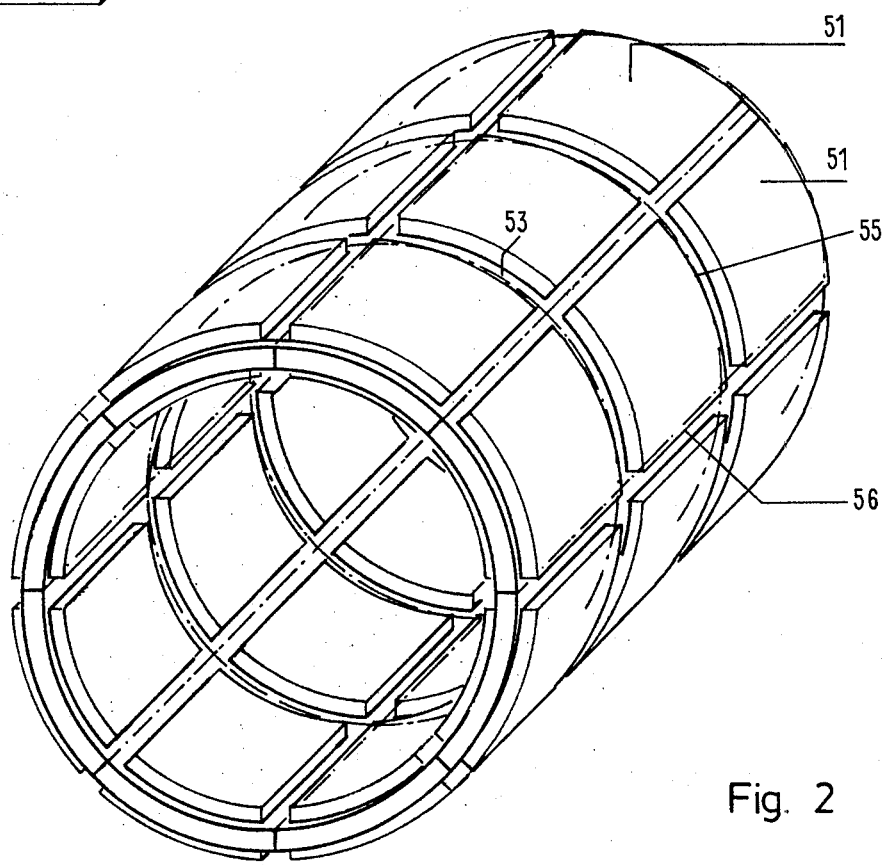
FIG. 2 is an elevated perspective view of a pipe assembled with tubbings or curved plates with a gasket strip in accordance with the invention.

FIG. 2 illustrates a different application. Here the building elements 1 are likewise right-angled, but are curved out of their plane. Such elements, known as tubbings, are used for the building of tunnels, conduit or galleries. It can be seen from this use that here there must be available a particularly complete sealing if the tunnel or the conduit is to be protected from flooding by water penetration.

As mentioned, in both cases the gasket strips can be arranged directly on the surfaces of the elements 1 (FIG. 1) or 51 (FIG. 2) be partly set in by the provision on the narrow sides 5, 6 (FIG. 1) or 55, 56 (FIG. 2) of a groove or a depression, not shown here.

There is not shown in these two embodiments an arrangement in which one row of elements is displaced relative to another row. By means of this arrangement continuous butt joints 3 (FIG. 1) or 53 (FIG. 2) can be avoided thereby improving the sealing (a measure which is known in entirely different arts, e.g. in the construction of buildings of baked stone masonry). However, the thereby arising T-shaped joints, in which two abutting elements are overlapped at their narrow faces 6 (FIG. 1) or 56 (FIG. 2) by a further element, are not entirely free from sealing problems, so that the instant embodiments also have application there.

Figure 3:
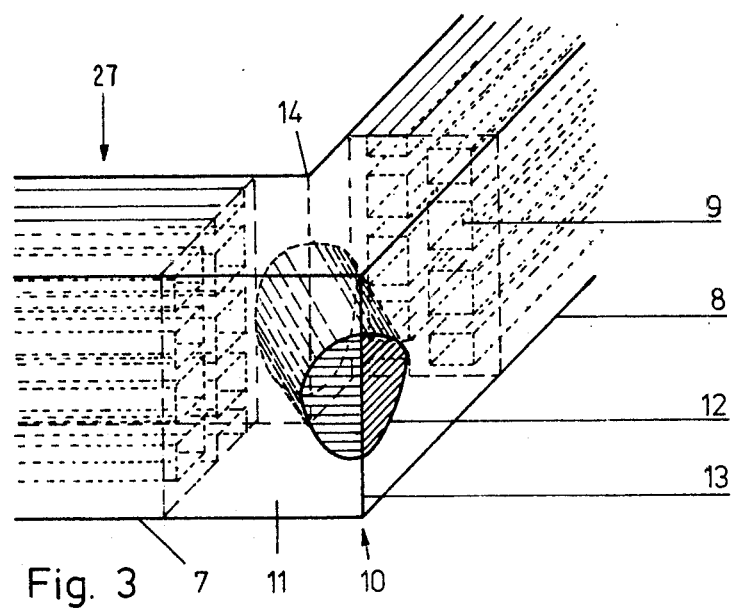
FIG. 3 is an elevated perspective view of a corner segment of a gasket strip in accordance with a first embodiment of the invention.

FIG. 3 shows a first embodiment of a gasket strip. It consists of two linear profiled segments or portions 7, 8 along one end face 5 (FIG. 1) or 55 (FIG. 2) and along another lengthwise, narrow face 6 of an element 1 (FIG. 1) or 51 (FIG. 2). These profiled portions 7, 8 obtain their cushioning resilience either by means of ribs (not shown) or from hollow spaces 9 which extend mutually parallel and are either closed (FIG. 5a) or lead to a bridge or portal design of the profiled portions 7, 8. The profiled material itself consists of a resilient, but relatively hard material.

Where the gasket strip ends at an end face 5 (FIG. 1) or 55 (FIG. 2) and begins at the narrow face 6 (FIG. 1) or 56 (FIG. 2), that is, at one of the four corners 10 of the element 1 (FIG. 1) or 51 (FIG. 2), there is provided in this embodiment a corner segment 11, for which there is used a material with resilient properties which are different from those of the material for the profiled portions 7, 8. These corner segments 11 are formed by pushing together the profiled portions 7, 8 from both sides in a vulcanizing mold to a precisely determined point spaced from the inner corner. The corner region remaining free is filled in with a plastic material. In the course of the vulcanization under pressure and heat thereafter it bonds fast to the profiled portions. The material hardness in the corner segments 11 is chosen to be substantially softer than that of the profiled portions. The flexibility of the profiled portions 7, 8 is achieved, as mentioned, within the cross-section resulting from deformation of the material under pressure. The entire cross-section in the corner segment of the material, which is practically incompressible, is to be deformed in all possible directions to fill the hollow spaces which result from tolerances or inaccuracies. However, this material must undergo an extreme deformation, which can be obtained only with a soft material. With this arrangement, even with large tolerances in the corner segment 11 there is obtained a good adaptation of the gasket strip in all possible directions. With the compression of the corner segment 11, there arises within the cross-section of the material a relatively great and almost uniform pressure, similar to that of a fluid, which nevertheless falls off somewhat toward the edges.

The described measures are nevertheless not entirely sufficient to bring about a complete sealing in the corner segments 11 when, as in FIGS. 1 and 2, four such segments 11 abut. For this reason, in each corner segment 11 there is a depression 12 in which, there is installed a different plastic material which, however, is not vulcanized and therefore remains plastic. This material extends a precisely determined height of the cross-section to the corner edge but is still embedded above and below by the vulcanizable resilient material of the corner segment 11.

Figure 4:
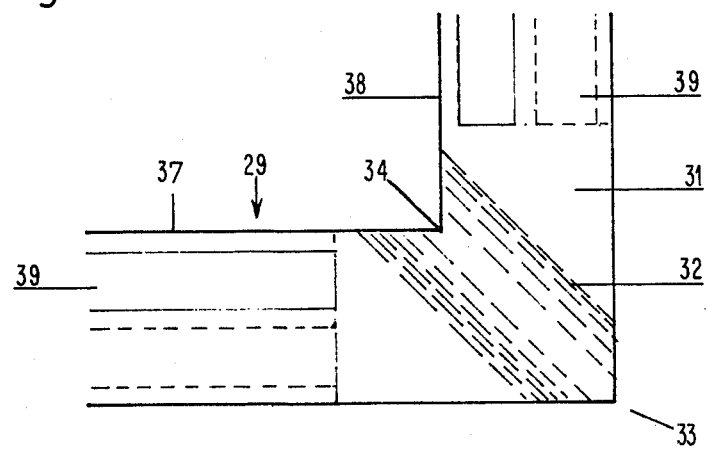
FIG. 4 is a top view of a corner segment of a gasket strip such as shown in FIG. 3, but slightly modified.
Figure 8:
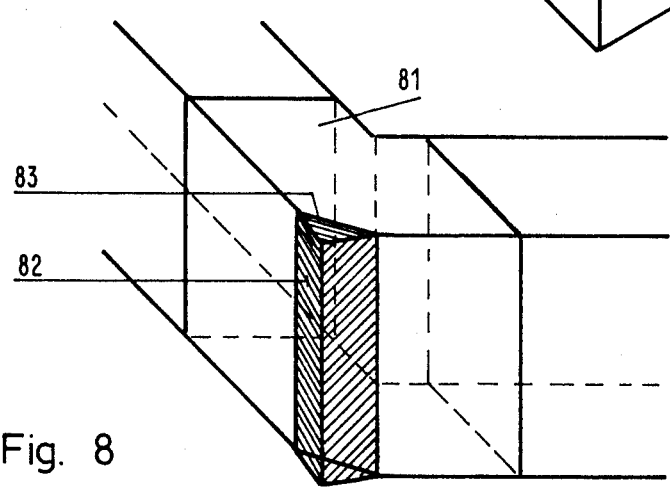
FIG. 8 is an elevated perspective view of the corner segment of a gasket strip in accordance with a fourth embodiment of the invention, in which only the corner segment is designed differently from the design of the gasket strip of the first and second embodiments.

FIGS. 3, 4 and 8 show how this depression 12 can appear. In accordance with FIG. 3, the depression is a hollow, cylindrical space into which the plastic material is filled, and this space extends essentially diagonally to the outer corner edge 13 of the corner segment. Here the material stops at the surface of the gasket strip 27 or its corner segment 11. As is shown in FIG. 4, the depression 32 can continue to the inner corner edge 34 or, as can be seen from FIG. 3, end beforehand. The particular shape of the space is not important and can just as well be prismatic.

In the compression of the corner segments 31, the inner pressure of the deformed resilient material of the corner segment 31 is transferred to the plastic material in the depression 32 and attempts to press it out in the direction of the outer corner edge 33, out of the depression 32. There, however, this material presses against the plastic material of the neighbouring corner segment or segments. The size of the surface of the plastic material which protrudes from the resilient corner segment 31 is chosen so that it is always greater than the maximum possible joint deviation. In this way, for every joint tolerance the critical contact point or points between two or more corners must automatically fall within the contact region of the plastic material.

Because the plastic material in the depression 32 has a very high viscosity, it perhaps cannot always deflect into hollow spaces which arise between abutting corner segments 31, since these hollow spaces often have only capillary dimensions. The plastic material is nevertheless completely surrounded with resilient material and because of its viscosity thereby finds itself in a completely surrounded space. Inside this space the pressure is uniform, so that the plastic material will eventually completely fill all the hollow spaces or gaps. Due to the special choice of materials, there arises an adhesive bonding in the contact region of the plastic material, of one corner segment with that of the other corner segment. The bonding continues to seal even if the actual sealing pressure should be relieved.

This adhesive bonding is obtained even when, in accordance with FIG. 6, the four corner segments 41 of the four gasket strips 24 deform rather strongly as a result of construction inaccuracies or also because of later displacements. Even then, the resilient material of each segment 41 and the plastic material of the depressions 42 maintain a complete sealing. The example illustrated here is somewhat idealized, since the two joints 22, 23 would generally not cross as illustrated here, but rather would form a network of T-shaped joints displaced relative to each other.

Figure 7A:
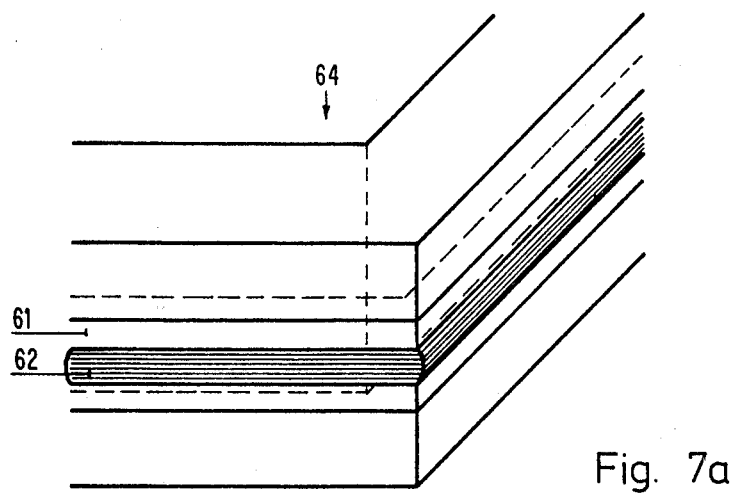
FIGS. 7a, 7b are elevated, perspective views of external and internal corner segments, respectively, of a third embodiment of a gasket strip in accordance with the invention.
Figure 7B:
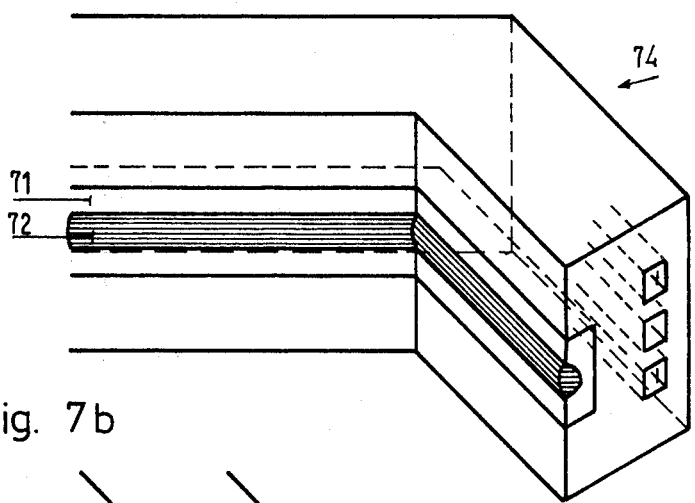

The FIGS. 7a and 7b show further embodiments of a gasket strip in accordance with the invention. In FIGS. 7a and 7b, the region which is filled with the soft resilient material extends as a belt shaped section 61 (FIG. 7a) or 71 (FIG. 7b) along the entire gasket strip 64 (FIG. 7a) or 74 (FIG. 7b), and therewith around the entire element 1 (FIG. 1). Within this segment 61 (FIG. 7a) or 71 (FIG. 7b) there is a depression 62 (FIG. 7a) or 72 (FIG. 7b), likewise in the form of a belt, which contains the plastic material. Here also the plastic material is pressed out of the depression 62 (FIG. 7a) or 72 (FIG. 7b) and seals the last remaining hollow spaces or gaps. As the two FIGS. 7a, 7b show, the corner section 61 (FIG. 7a) or 71 (FIG. 7b) and the depression 62 (FIG. 7a) or 72 (FIG. 7b) can be arranged on the outer or inner side of the gasket strip, i.e. on the side toward the element, respectively. Also conceivable is the combination of the features of both embodiments of FIGS. 7a, 7b in a single gasket strip.

A further embodiment in accordance with FIG. 8 is a variant of that according to FIGS. 3 and 4, in which there is likewise a corner segment 81. Here, however, the depression 82, has the shape of a three-sided prism which fills the outer corner edge 83 along the entire height of the gasket strip. The bonding of abutting plastic zones 82 of different gasket strips results here over a larger contact surface, by which the sealing action is increased for difficult sealing problems.

Two alternative shapes of the gasket strips are shown by FIGS. 5a and 5b. FIG. 5a depicts a cross-sectional view of a profiled portion 7 or 8 of the gasket strip 27 of FIG. 3 disposed in a depression on element 1 of FIG. 1 or on element 51 of FIG. 2. This view is taken at a point away from corner segments 11 of FIG. 3, and shows the configuration of hollow spaces 9. FIG. 5b similarly depicts a cross-sectional view of a profiled portion 37 or 38 of the gasket strip 29 of FIG. 4 disposed in a depression on element 1 of FIG. 1 or on element 51 of FIG. 2. This view is also taken at a point away from corner segments 31 of FIG. 4 and shows the configuration of hollow spaces 39.

We claim:

1. A gasket strip of a first material for forming a compression seal between abutting end faces of adjoining building elements, the building elements having a polygonal cross-section with flat faces along the perimeter, the gasket strip extending in the manner of a frame about the perimeter of the building element, the improvement therein comprising:
   at least one section of said gasket strip which is of a second material, more elastic than the first material making up the remainder of said gasket strip, said second material defining a depression, and
   a third material lying at least partially in the depression in said second material and plastically deformable under pressure.

2. The gasket strip according to claim 1, wherein said one section includes only corner segments of said gasket strip where linear portions of said gasket strip approach each other from adjacent sides of said building element, each of said corner segment defining its own depression.

3. The gasket strip according to claim 1 or 2, wherein said third material is cylindrical and extends essentially perpendicularly inward from the outer corner edge of said corner segment and at equal angles to said ajacent linear portions and has its surface exposed only at outer surface areas of said corner segment which adjoin at said outer corner segment edge.

4. The gasket strip according to claim 2, wherein said third material includes the full length of said corner segment edge.

5. The gasket strip according to claim 1 or 2, wherein said third material is cylindrical and extends perpendicularly between the inside and outside corner edges of said corner segment with its ends being exposed at the inside and outside corner edges.

6. The gasket strip according to claim 1, wherein said gasket strip defines a groove which extends along its entire outer perimeter surface.

7. The gasket strip according to claim 6, wherein said second material lies in said groove.

8. The gasket strip according to claims 6 or 7, wherein said second material lies in at least one groove extending about the entire inner surface of said gasket strip and at least one depression extending about the entire outer perimeter surface of said gasket strip.

* * * * *

UNITED STATES PATENT AND TRADEMARK OFFICE
CERTIFICATE OF CORRECTION

PATENT NO. : 4,195,850
DATED : April 1, 1980
INVENTOR(S) : Ernst Berger and Norbert Herwegh It is certified that error appears in the above—identified patent and that said Letters Patent is hereby corrected as shown below:

Column 3, line 56, "narrow face 6 of an" should read --narrow face 6 (Fig. 1) or 56 (Fig. 2) of an --.

Signed and Sealed this

Eleventh Day of November 1980

[SEAL]

Attest:

SIDNEY A. DIAMOND

Attesting Officer

Commissioner of Patents and Trademarks